No. 774,233. PATENTED NOV. 8, 1904.
J. H. COX.
WATER FILTER.
APPLICATION FILED MAY 16, 1904.
NO MODEL.

Witnesses
E. F. Stewart
C. N. Woodward

John H. Cox, Inventor,
by C. A. Snow & Co.
Attorneys

No. 774,233.

Patented November 8, 1904.

UNITED STATES PATENT OFFICE.

JOHN H. COX, OF ERIE, KANSAS.

WATER-FILTER.

SPECIFICATION forming part of Letters Patent No. 774,233, dated November 8, 1904.

Application filed May 16, 1904. Serial No. 208,245. (No model.)

*To all whom it may concern:*

Be it known that I, JOHN H. COX, a citizen of the United States, residing at Erie, in the county of Neosho and State of Kansas, have invented a new and useful Water-Filter, of which the following is a specification.

This invention relates to devices employed for filtering water and for like purposes, and has for its object to simplify and improve the construction and produce a device of this character which may be inexpensively manufactured, will be efficient in action, and may be readily cleansed and the filtering material renewed or cleansed without destroying any parts of the structure.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all changes and modifications which fairly fall within the scope of the invention and the claims made therefor.

Figure 1:
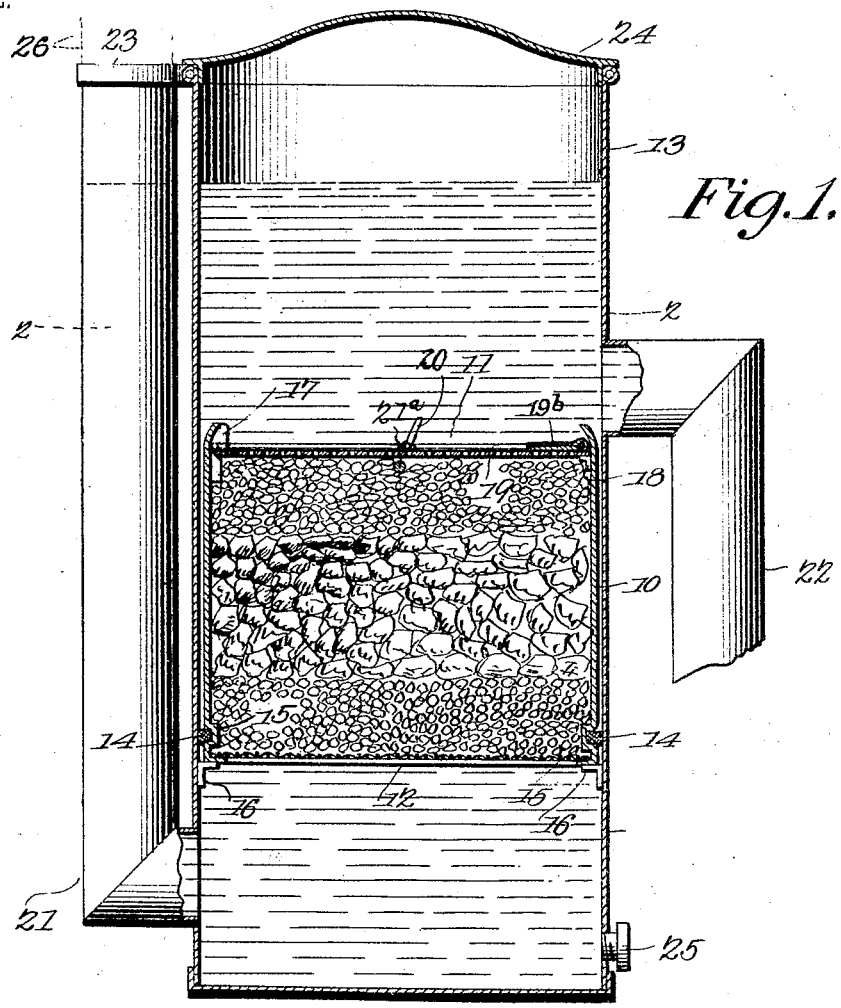
Figure 2:
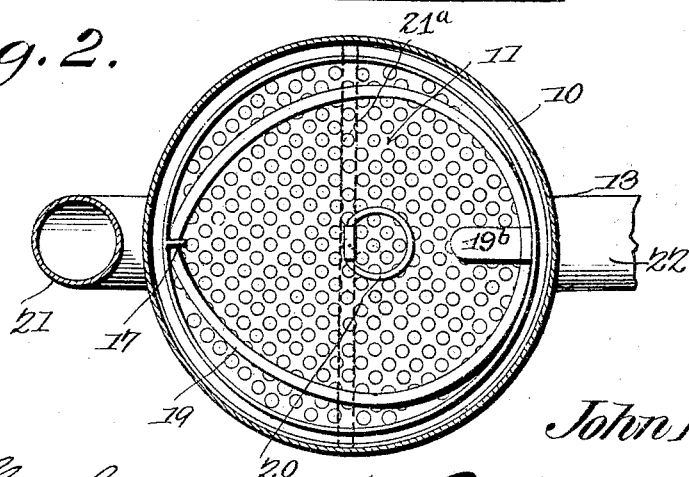

In the drawings thus employed, Figure 1 is a longitudinal sectional elevation. Fig. 2 is a transverse section on the line 2 2 of Fig. 1.

The improved device is designed more particularly for filtering rain-water before it enters the cistern or other receiver and to that end is preferably arranged for connection into the conductors between the roof-gutters and the cistern, but may be employed for filtering liquids in connection with other structures or apparatus by making slight and immaterial modifications in some of the minor parts.

The improved device comprises a receiver or casing for the filtering material having imperforate sides 10 and perforated ends 11 12, one of the perforated ends being preferably detachable. The casing 10 is adapted for support in a vessel 13, through which the water or other liquid to be filtered is caused to pass, and will be provided with a packing means, such as rubber or other flexible member 14, disposed between the vessel and casing. The packing member may be secured in any suitable manner, as by an annular channel 15 encircling the casing 10.

The casing 10 is supported upon lugs 16, extending inwardly from the wall of the vessel 13, and said casing 10 is provided at its upper edge at one side with a notched lug 17 and at its diametrically opposite side with a supporting-lug 18. A transverse bar 21$^a$ is also provided intermediate the lugs 17 18. These members coöperate to support the detachable perforated end piece 11, which latter is provided with a handle 20, whereby it may be conveniently manipulated.

The member 11 is supported in position by a divided resilient ring 19, with the ends disposed upon opposite sides of the upper portion of the lug 17 and with the bowed portion "sprung" into engagement with the opposite inner face of the casing 10, the upper rim of the latter being slightly curved inwardly to provide a holding means for the spring-ring. The latter is provided with a handle member 19$^b$, whereby it may be conveniently manipulated. By this simple means the member 11 is held with sufficient force to prevent accidental displacement, but which may be readily removed when desired to renew the filtering material or for other purposes. The filtering material is thus renewable without removing the casing from the vessel; but a handle member 20 is provided upon the casing to enable the latter to be removed when required.

The vessel 13 is provided with a supply-pipe 21 near the bottom at one side beneath the casing 10 and with an outflow 22, located just above the casing 10 and preferably on the opposite side from the inflow 21. The inflow-pipe 21 is extended upwardly, as at 23, to a point even with or above the upper line of the vessel 13 for connection with the supply, such as the rain-water conductor indicated at 26.

The vessel 13 will be provided with a removable cover 24 and with a draw-off plug 25 to facilitate the removal of the water when the vessel is to be cleaned.

By this simple arrangement it is obvious that the water entering the stand-pipe 23 will necessarily pass upward through the filtering material and be drawn off through the outflow 22 and none of the unfiltered water can pass the casing 10 because of the presence of the packing 14.

The parts may be of any size or quality of material, but will preferably be of galvanized iron or steel or other non-corrodible metal.

The device may be disposed at any desired point relative to the cistern or other receiver for the filtered water, so that the filtered water may flow thereto; but as the receiver forms no part of the present invention it is not illustrated.

Having thus described the invention, what is claimed is—

1. In a filtering device, a casing constituting a container for filtering material, having a perforated bottom and a perforated upper end, supporting-lugs for the detachable end, one of said lugs being provided with a notch, and a divided, resilient securing-ring sprung into the end of the casing above the perforated detachable end member, with its ends in engagement with opposite sides of the upper portion of the notched lug.

2. In a filtering device, the combination with a vessel having an inlet near its lower end and an outlet near its upper end, of a casing supported detachably in said vessel and constituting a container for filtering material, said casing having a perforated bottom, a perforated, detachable upper end, a cross-bar, and supporting-lugs for said perforated, detachable end, one of said lugs having a notch; and a divided resilient securing-ring having a handle mounted thereon.

In testimony that I claim the foregoing as my own I have hereto affixed my signature in the presence of two witnesses.

JOHN H. COX.

Witnesses:
C. D. SMITH,
JOHN R. GARVIN.